United States Patent [19]

Bowles

[11] 4,071,960

[45] Feb. 7, 1978

[54] SYSTEM FOR ARTICULATE DRYING AND TRANSPORT

[76] Inventor: Romald E. Bowles, 2105 Sondra Court, Silver Spring, Md. 20904

[21] Appl. No.: 635,420

[22] Filed: Nov. 26, 1975

Related U.S. Application Data

[63] Continuation-in-part of Ser. No. 535,118, Dec. 20, 1974, abandoned.

[51] Int. Cl.² ............................................. F26B 17/04
[52] U.S. Cl. .................................... 34/57 A; 34/191; 137/842; 239/101
[58] Field of Search ................. 34/10, 57 A, 191, 51, 34/156, DIG. 13, 160; 302/29, 30, 31; 226/97; 137/835, 842; 239/4, 101, 102, DIG. 20

[56] References Cited

U.S. PATENT DOCUMENTS

| | | | |
|---|---|---|---|
| 3,293,768 | 12/1966 | Blank et al. | 34/191 |
| 3,432,804 | 3/1969 | Beeken | 137/842 |
| 3,434,487 | 3/1969 | Bauer | 137/835 |
| 3,444,879 | 5/1969 | McLeod, Jr. | 137/835 |
| 3,592,395 | 7/1971 | Lockwood et al. | 34/10 |
| 3,614,964 | 10/1971 | Tsu-Fang Chen | 137/835 |

*Primary Examiner*—John J. Camby
*Assistant Examiner*—Larry I. Schwartz
*Attorney, Agent, or Firm*—Rose & Edell

[57] ABSTRACT

A system for drying and/or transporting particulate material, including fluidizing the material by means of pulsed air flow in jets which oscillate parallel to the path of motion of a bed of the material in an assymetric sweeping fashion which applies a net transporting force in one sense or direction, or by applying such pulsed flow so that the net force in either sense is zero, to cause drying without transport. The system utilizes phase locked acoustic oscillators to provide sweeping jets of fluid moving in opposite directions for drying and in the same direction for transporting the particulate material. The fluid oscillators are fabricated from 2 groups of molded or extruded members with the members of each group being identical. Spacers are employed to position the parts whereby to provide the desired oscillator configuration.

21 Claims, 2 Drawing Figures

SYSTEM FOR ARTICULATE DRYING AND TRANSPORT

CROSS REFERENCE TO RELATED APPLICATION

This application is a continuation in part of U.S. Ser. No. 535,118 filed on Dec. 20, 1974, entitled "System for Coal Drying and Transport" and now abandoned.

BACKGROUND OF THE INVENTION

In processing pulverized coal large quantities must be dried to a controlled moisture level. Current drying techniques make use of fluidized beds of coal through which a steady flow of air is passed, which removes moisture. In the presence of high temperatures smaller particles of coal cake and behave as if they were damp, even when dry. Under these conditions the steady state of the fluidized bed is unstable and spouting in the bed takes place. The result is uneven air contact with the particles.

It is known that drying of a solid by an air stream is facilitated if the air stream is in the form of pulses. According to the present invention phase coordinated fluidic oscillators apply pulsed flow of air to a bed of fluidized coal, the flow being spatially oscillatory. Such action provides an agitation of the fluid particles, since at any point of the bed there exists cyclic air velocity rapidly varying in both flow direction and flow amplitude, which significantly reduces drying time, providing in-bed particle circulation to prevent caking and minimizes air flow requirements.

The present system operates by flowing air through phase locked acoustic oscillators, which are so intercoupled that adjacent ones of the oscillators provide jets which move symmetrically about a centerline so that no net transport force is applied to the bed.

If transport of a bed of coal is desired, the pulsed flow deriving from an array of phase locked oscillators is so arranged that all the output jets of the oscillators move assymetrically about a centerline and preferably in phase so that a net transport exists in one direction. The transport rate is then a function of a balance between air momentum, gravitational forces established in terms of a slope or inclination of the bed from the horizontal, and the average size, shape and density of the particles of the bed. Transport can be achieved in beds which are either horizontal or descending in the direction of flow.

The oscillators of the present system are preferrably of the general type disclosed in U.S. Pat. No. 3,432,804 wherein lying between aligned fluid inlet and outlet passages are generally circular chambers serving as resonant cavities. A stream of pressurized fluid issuing from the inlet passage is laterally deflected cyclically so that quantities of fluid are directed to the outlet passage which vary at a cyclic rate equal to twice the frequency of the rate of deflection of the fluid stream. If the outlet passage is flared symmetrically outwardly, the fluid stream sweeps across the downstream end of the passage providing the symmetrical spatially oscillatory flow discussed above. If the outlet passage is flared outwardly in an assymmetrical fashion, the fluid stream sweeps across the downstream end of the passage providing the assymmetrical spatially oscillatory flow discussed above.

In accordance with the present invention, the individual oscillators are phase coordinated by interconnecting the resonant lobes of adjacent oscillators. The oscillators resonate at substantially equal frequencies (or harmonics thereof) so that the interchange of acoustic energy between the resonant lobes or cavities of adjacent oscillators insures phase and frequency coordination. The phases of adjacent oscillators may be the same or out of phase by specified degrees depending upon the length of the passages interconnecting the resonant cavities.

Advantages of the present system are that it operates in extreme environments, reduces transport mechanism complexity, reduces air flow requirement for fluidization, agitates the particles of a bed during fluidication to reduce particle caking and improves heat and mass transfer between the particles and the fluidizing gas.

The oscillators of the present invention may be fabricated from 2 groups of members; a group of upper members and a group of lower members with the members within each group being identical. The members may be extruded, molded or formed by other conventional techniques and are held in place relative to one another by spacers and outer members to form between pairs of said groups of members a power nozzle, an output channel, resonant cavities and resonant cavity interconnections to provide phase coordinated oscillators. The physical structure thus provided is simple and fast and quite economical to construct.

SUMMARY OF THE INVENTION

Devices for drying, fluidizing and transporting a bed of particles, such as coal, by applying sweeping pulses of air generated by phase-coordinated fluid oscillators, to the underside of the bed. The fluid oscillators are fabricated from an array of 2 groups of identical parts with spacers to maintain spacing between the members of each group.

DETAILED DESCRIPTION OF THE INVENTION

Figure 1:
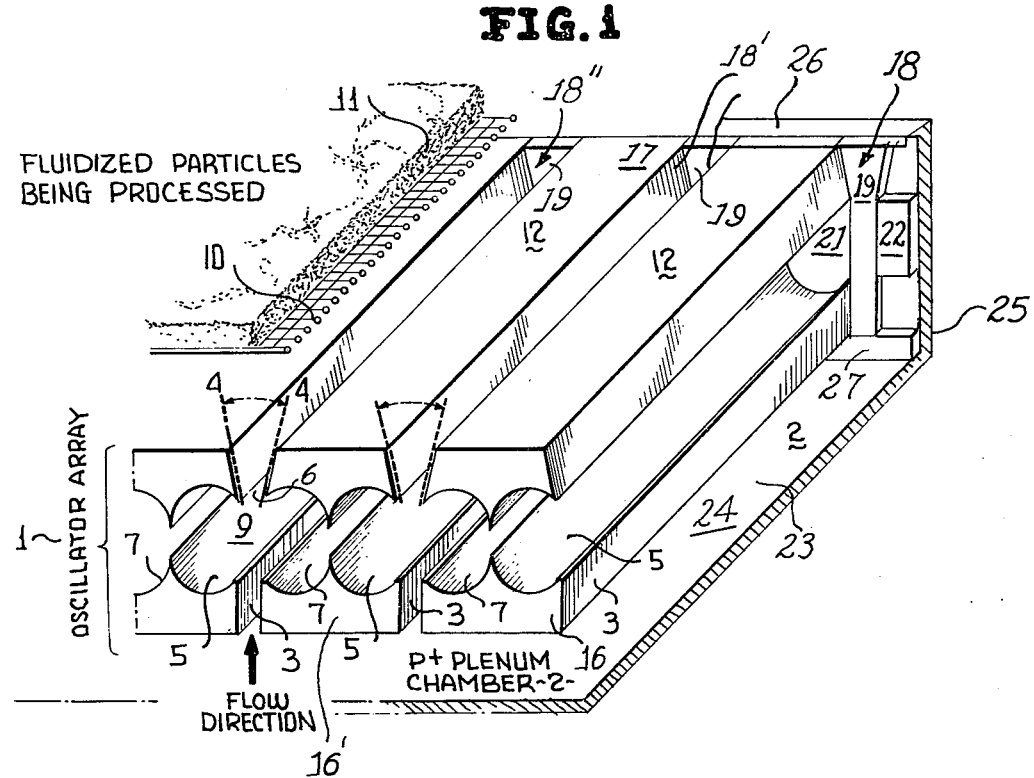
FIG. 1 is a view in perspective of a fluidized bed drying system employing phase coordinated oscillators as sources of symmetrical oscillatory air flow applied to the bed.

Referring to FIG. 1, air is supplied to a plenum 2, under pressure, which in turn supplies the air to a plurality of power nozzzles 3 of an oscillator array 1. While two such nozzles are illustrated a large number may be employed and the two illustrated are for example only. Each power jet issues from each nozzle 3 through an interaction chamber 9 having resonant chambers 5 and 7 entering from opposite sides thereof. The power jet exits via a symmetrical discharge or outlet passage 6; each associated group of the elements 3, 5, 6, 7 and 9 constituting an acoustic oscillator. Although each of such associated groups is illustrated as one elongated oscillator discrete oscillators operating in the same or different plans may be employed.

The configurations of the resonant channels 5 and 7 and interaction region 9 cause the streams issuing from the nozzles 3 to sweep laterally relative to the entrance to output passage 6 so that the direction and the amplitude of the output stream are time variables.

The time variation of the amplitude of the stream is determined by, among other things, the width of the ingress end of the passage 6 relative to the egress end of the nozzle 3. If the egress end of nozzle 3 equals or is less than the dimension of the ingress end of passage 6 the amplitude of the output signal varies as a sine function. As the width of the ingress to passage 6 decreases relative to the width of the egress from nozzle 3, the flow from passages 6 becomes increasing pulsed approaching discrete pulses of short duration as a practical limit. The choice of a particular configuration of the output jet is a matter of choice determined primarily by the characteristics of the material to be treated, size of particles, surface characteristics, density, etc. The position of the stream is swept across the egress orifice of the passage 6 of FIG. 1 in a symmetrical pattern so that particles 11 lying on screen 10 are agitated at a rate determined by the frequency of the oscillators. Agitation may be enhanced by having adjacent oscillators operate out of phase so that adjacent regions of the particular material are subject to different air flow rates and pressures thereby causing such adjacent regions to undulate relative to each other to increase agitation.

The relative phases of the oscillators, according to the present invention, are controlled by interconnecting appropriate chambers 5 and 7 of adjacent oscillators. In FIG. 1 interconnection of the oscillators is affected by having the resonant chambers 5 and 7 of adjacent oscillators overlap slightly so that the chambers are in direct acoustic communication with one another. In consequence the sonic waves created in each chamber are coupled to the other chambers and as a result of forced resonance the sonic waves generated in one chamber reinforce the sonic waves generated in the other chamber and vice versa. Specifically, rarefaction waves appear at the right and left sides, of the left and right oscillators, respectively, to cause the streams to move to the right and left, respectively, at the same time. Thus, in FIG. 1, when the jet of the left oscillator is adjacent the right side of interaction chamber 9, the jet of the right oscillator lies adjacent the left side of the chamber 9 producing out of phase operation and efficient undulation of the bed of particular material. Since the discharge jets move symmetrically between right and left extremes of travel of each cycle of oscillation there is no tendency to transport the bed of material. The effect of the jets is to fluidize and agitate the material and as a result of the air flow through the loose, fluidize, material, heat and mass transfer is accomplished with resultant drying. The net effect of the air flow produced by the oscillators of the present invention is to accomplish drying of the material at lower air pressures and mass flow rates than is possible with unmodulated flow.

As indicated above the net effect of the oppositely moving streams is to cause the bed of fluidized particles 11 being processed to remain stationary. Slow net movement in a desired direction can be accomplished with the arrangement of FIG. 1, for example to the right, by inclining the entire structure downward to the right. Although the net effect of the jets, per se, is zero, the material is fluidized and tends to move under the influence of gravity in the direction of the downward slope.

Figure 2:
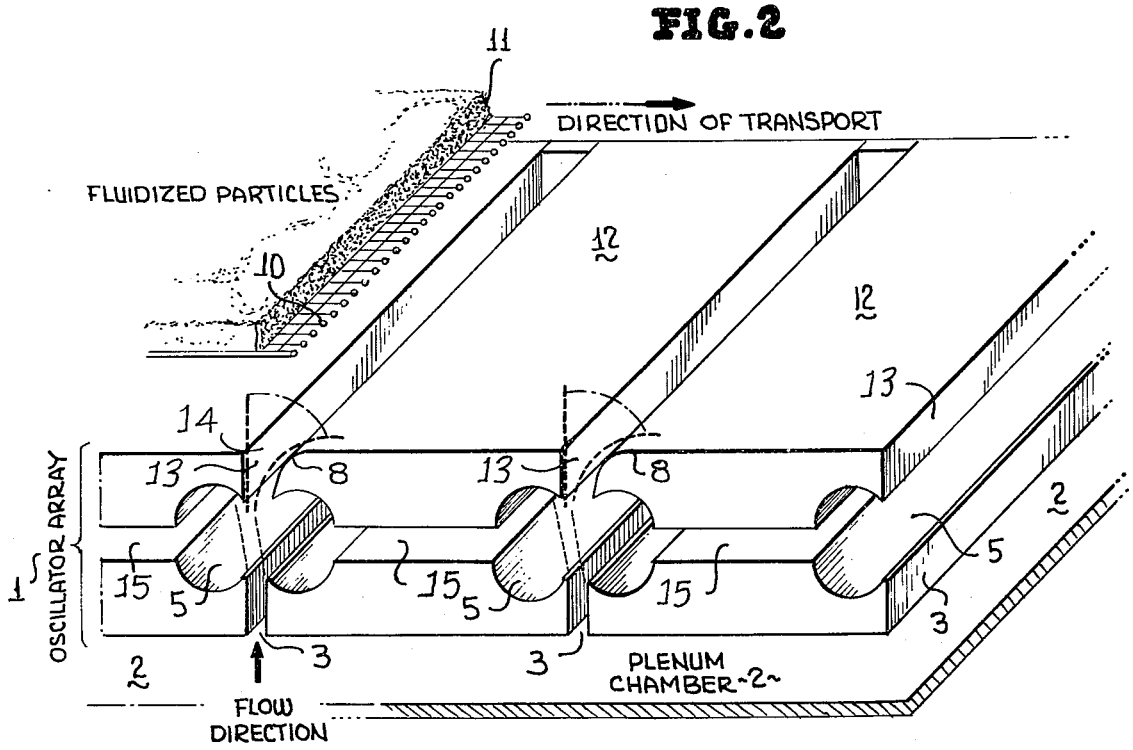
FIG. 2 is a view in perspective of a fluidized bed transport system employing phase coordinated acoustic oscillators as sources of oscillatory assymmetrical air flow applied to the bed.

A more efficient mechanism for producing flow of the fluidized material in a specific direction is illustrated in FIG. 2 of the accompanying drawings. The array illustrated in FIG. 2 differs from that illustrated in FIG. 1 in only two respects, the coupling between chambers 5 and 7 of adjacent oscillators and the shape of the output or discharge passage 13.

Since it is desired to transport the fluidized material a net thrust in the desired direction of movement must be generated. Referring to the discharge passage 13 of FIG. 2 left wall 14 is generally parallel to the center line of the nozzle 3 while right wall 8 is curved to the right at a radius such that the jet as it approaches the wall 8 is increasingly deflected to the right by boundary layer effects. The above construction of the passage 13 insures that the output stream of the oscillator, in the example, sweeps from the vertical position almost to the horizontal position to the right thus producing a net flow to the right. Efficiency of transport dictates that the streams of all the oscillators move in the same direction at the same time, i.e., cophasally. Such operation is accomplished by interconnecting chambers 5 and 7 of adjacent oscillators through a passage 15 of a length such that the oscillators are in phase.

As previously indicated the relative phases of adjacent oscillators in FIGS. 1 and 2 is a function of the length of the channel interconnecting resonant cavities of the oscillators. Adjacent oscillators operate in phase when the distance from nozzle centerline to extreme side of the resonant chamber "M" of adjacent oscillators equal to $M_1 = M_2$ . . . and the feedback channel lengths connecting adjacent oscillators L are equal $L_1 = L_2$ . . ., and wherein L is approximately equal to $2nM$, $n$ being an integer including 0, 1, 2, 3, etc. M is the distance from the centerline of the oscillator to the entrance of feedback channel 15. When the power jet swings from the centerline towards one side wall, pressure starts building up in that side chamber 5 or 7 and a pressure signal is propigated towards the feedback channel entrance. This pressure signal is reflected by the adjacent walls of side chamber 5 or 7 and returns to the power jet arriving at the time when the power jet is again aligned with the inlet-outlet nozzle centerline. The signal transit time is nominally equal to 2M divided by the local speed of sound. If the entrance to feedback channel 15 opens into a very large volume having no opposite wall then that portion of the side chamber 5 and 7 pressure wave which impacts the entrance to feedback channel 15 will be reflected as a rarifaction wave and weaken the total reflected wave pattern within the side chamber. If the entrance to feedback channel 15 is blocked by a solid wall, then that portion of the side chamber 5 or 7 pressure wave which impacts the entrance to feedback channel 15 will be reflected as a compression wave of substantially equal value and will reinforce the total reflected wave pattern within the side chamber. If the oscillators 9 adjacent to each other are cycling as mirror images of each other, i.e., when the power jet of the oscillator in one position swings to its side chamber 7 while that of the oscillator in the adjacent position swings to its side chamber 5 concurrently, then the pressure wave of the oscillator of the first position will be at its end of feedback channel 15 at the same time that the pressure wave of the adjacent oscillator is at its end of the same feedback channel 15. These two pressure waves will travel into channel 15 in opposite directions and meet midway along the length of channel 15 and be reflected back towards their respective ends of feedback channel 15. If the length L of the feedback channel is equal to 0, 4M, 8M etc., i.e., $L = 4nM$, where $n$ is an integer including $n = 0, 1, 2, 3,$ etc., then the reflected feedback channel 15 signal will arrive at the entrance of feedback channel 15 concurrently with arrival of another identical side chamber pressure wave of corresponding amplitude generated by corresponding motion of the power jet in a subsequent cycle. It is a function of this feedback channel 15 to provide coupling of adjacent oscillators which will encourage them to operate in a phase coordinated fashion. If the oscillators start to get out of phase then the feedback channel reflected signal will not exactly match the subsequent side chamber signal and will instead delay or accelerate the oscillators' action to cause subsequent signals to so coincide.

If adjacent oscillators operate not in a mirror image fashion as described above, but in an identical synchronized fashion so that the power jets of adjacent oscillators swing to the right concurrently, then the maximum pressure wave of the oscillator of one position will enter its end of feedback channel 15 at a time when a minimum pressure wave of the adjacent oscillator enters its end of feedback channel 15. The minimum pressure wave of an oscillator enters the feedback channel 15 mid-way time-wise between successive maximum pressure waves of that oscillator entering the same feedback channel.

If the length L of the feedback channel 15 is equal to 2M, 6M, 10M, etc., i.e., $L = 2(2n+1)M$, where $n$ is an integer including $n = 0, 1, 2, 3$, etc., then the pressure waves entering the two ends of feedback channel 15 will interact such that while one end of feedback channel 15 is experiencing a minimum pressure level the opposite end of feedback channel 15 will be experiencing a maximum pressure level and the adjacent oscillators will be properly coordinated to maintain their existing phase relationship. Thus, if one desires the presence of simultaneous outputs and also desires identical power jet sweep motion during the output pulses then the value of feedback channel 15 length L should be $L = 2(2n+1)M$, where $n$ is an integer including $n = 0, 1, 2, 3$, etc. The desirability of identical power jet sweep motion for some applications has been described for example in FIG. 2 to provide transport of a fluidized bed.

If, however, one desires only simultaneous output pulses or wave forms at for example outlet nozzle 6 of FIG. 1 and one is not concerned with the direction of jet sweep, then the feedback channel 15 can have a length $L = 2nM$, where $n$ is an integer including $n = 0, 1, 2, 3$, etc.

It is stressed that the symbol = identifies an approximate length of L. When it is intended that the pressures at the ends of channel 15 be equal and in phase, $L \doteq nM$, the acoustic signal will traverse L is one direction in $n/f$ seconds (where $f$ is the oscillator power jet cycle frequency) and $L = nc/f$ (where $c$ is the local speed of sound). When the pressures at the ends of channel 15 are to be 180° out of phase; $L \doteq 2(2n+1)M$, $(2n+1)/2f$ seconds will be required for the acoustic signal to traverse L in one direction and $L \doteq (2n+1) c/2f$.

For oscillators of the general type illustrated in FIGS. 1 and 2 the fundamental frequency is approximately $f = 4M/c$. Where frequency of the selected oscillator configuration is dependent upon volumetric flow rate, the feedback channel 15 length L is better established by $L \doteq nc/f$ than by $L = 4nM$ and similarly is better established by $L \doteq (2n+1) c/2f$ than by $L = 2(2n+1)M$.

In such oscillators the feedback channel 15 should connect two adjacent oscillators at control locations where pressure fluctuates cyclicly but where flow does not fluctuate significantly, i.e., pressure antinodes and where possible flow nodes.

This relationship insures that the oscillators will operate in a phase coordinated manner with simultaneous output pulses at outlet nozzles 6 and 13. One cycle of an oscillator includes the sweeping of the power jet from one extreme position to the opposite extreme position and return to the original extreme position. During one cycle of the oscillator its power jet sweeps past the outlet nozzle 6 and 13 twice. Thus, for cases where the width of the inlet to passage 6 is smaller than the egress of nozzle 3, if the oscillator frequency is $f_1$ then the output pulse amplitude frequency will be $2f_1$. For sweeping output jets the output jet sweep frequency is $f_1$ as the output has directionality as well as amplitude cyclic oscillation.

The physical structure of the apparatus of the present invention may preferably take the form illustrated in FIGS. 1 and 2. According thereto a lower member 16 which may comprise an extruded metal or molded plastic member provided one wall of the power nozzle 3 and the lower portion or lobe of resonant chambers 5 and 7 of adjacent oscillators. A second extrusion or molded upper member 17 provides one wall of the output passage 6 and the upper lobes of resonant chambers 5 and 7 of adjacent oscillators. The members 16 and 17 are disposed horizontally adjacent identical members 16' and 17' to form a single oscillator generally designated by reference numeral 18' and one-half parts of adjacent right and left oscillator 18 and 18".

The various members 16, 16' .... and 17, 17' .... are held in spaced relation to one another and each other by spacers 19 conforming in shape to the desired configuration of nozzle 3, output passages 6 and interaction region 9. The spacers are provided with opposed side members or ears 21 and 22.

The entire structure is held together by outer generally U-shaped member 23 having a base 24 and two upstanding end walls 25, only the rear one of which is illustrated. The walls 24 have turned in lips 26 which bear against the top surface of 12 of the members 17, 17'

To assemble the structure bottom spacers 27, only the rear one of which is illustrated, are placed horizontally on the upper surface of base 24 and against and extending parallel to the inner surface of end walls 24. A first bottom member 16 is slid along the spacers 27 and seated against an end wall, not illustrated, of the member 23. Upper member 17 is then inserted along with front and back spacers 19 the ears 21 maintaining proper spacing between members 16 and 17. The next pair of members 16' and 17' are inserted with the body of spacer 19 providing proper spacing between adjacent horizontal members 16 and adjacent horizontal members 17 and the ear 22 of the spacer 19 maintaining the vertical spacing between members 16 and 17.

An alternate method of assembly may be employed wherein the members 16, 17 and 19 are assembled with the U-shaped member 23 and after assembly the lips 26 are formed to rigidify the entire assembly.

In either event, the structure is unusually simple employing 2 groups of identical members and two different types of spacers one of which provides the plenum and the others of which provide the necessary vertical and horizontal spacing between the members of each and of the two groups of members 16 and 17 to define the oscillator channels and interconnections.

The bed of particles 11 and its supporting screen 10 may be horizontal, or both may incline from the horizontal similarly, so that the bed of particles tends to move, under the influence of gravity, to the right. The movement of the bed is then accelerated by the net flow of pulsed air, to the right, while the pulsed flow maintains bed fluidization. There exists a concurrent drying effect, and improved heat and mass transfer of the particles and the gas, and the agitation of the particles reduces the possibility of particle caking.

While the coal or other particulate matter is illustrated as supported by a screen 10, the latter is not necessary and the coal or other particulate matter may be supported directly on the upper surface 12 of the drier, it being understood that the widths of the discharge nozzles 6 and 13 are small, and that gas, usually air, under pressure is exiting at all times, so that none of the particulate matter can lodge within the oscillators.

The method and means for phase coordinating sonic oscillators is not peculiar to the particular sonic oscillator illustrated and is applicable to sonic oscillators of other designs.

While we have described and illustrated specific embodiments of our invention, it will be clear that variations of the details of construction which are specifically illustrated and described may be resorted to without departure from the true spirit and scope of the invention as defined in the appended claims.

What I claim is:

1. In combination for treating a bed of particulate material, a support for said bed of particulate material, said support being pervious to jets of gas, an array of jet sources underlying said support and directing jets of said gas against said bed, said array comprising plural oscillators, means applying said gas under pressure to all said plural oscillators, each of said oscillators including an interaction region, a discharge nozzle, a power nozzle for issuing a stream of fluid through said interaction region toward said discharge nozzle and at least one resonant chamber located along one side of said interaction region between said nozzles, and phasing means intercoupling said resonant chambers to produce phase coordinated sonic oscillations in said chambers.

2. The combination according to claim 1, wherein said interaction regions said resonant chambers and said discharge nozzles are elongated axially and narrow transversely.

3. The combination according to claim 1, wherein said oscillator produces sweeping gas flow and wherein said phasing means are arranged to provide spatially cophasal sweeping jets.

4. The combination according to claim 1, wherein said phasing means are arranged to provide contraphasal spatially sweeping jets.

5. The combination according to claim 2, wherein said discharge nozzles are transversely symmetrical.

6. The combination according to claim 2, wherein said discharge nozzles are substantially identically transversely assymetrical.

7. The combination according to claim 6, wherein one set of surfaces of said discharge nozzles is composed of planar surfaces and another set of arcuate surfaces.

8. The combination according to claim 2, wherein each of said chambers, said regions and said discharge nozzles extend axially wholly across said bed and wherein said discharge nozzles are spatially distributed along the length of said bed.

9. The combination according to claim 8 further comprising a plurality of spaced continuous walled members defining said discharge nozzles therebetween, each said member providing a surface generally perpendicular to flow through said discharge nozzle at the downstream end of said discharge nozzle, said surface providing said support.

10. In combination in a system an array of at least two oscillators, each of said oscillators including an interaction region, at least one separate resonant chamber in sonic communication with said interaction region, a discharge passage, means for issuing fluid across said interaction region toward said discharge passage, and passages intercoupling said resonant chambers to enforce phase coordinated oscillations in all said oscillators.

11. The combination according to claim 10, wherein said passages have lengths such that said oscillations are cophasal in all said chambers.

12. The combination according to claim 10, wherein said passages have lengths such that adjacent ones of said chambers support contraphasal oscillations.

13. The combination according to claim 10, wherein said system is a system for treating material and wherein said material is coal in particulate condition.

14. The combination according to claim 10, wherein said system is a system for treating material and wherein material is particulate material.

15. The combination according to claim 12, wherein said passages are axially elongated, means for producing a sweeping motion of fluid exiting from said passage across a plane transverse to said elongated axis of said passages.

16. The combination according to claim 15, wherein each of said passages is defined by one arcuate wall configured to entrain said fluid to produce a flow of said fluid having a large component of direction perpendicular to said passages.

17. A plurality of non-moving part phase coordinated oscillators comprising a plurality of oscillators each including means for receiving a stream of fluid, an interaction region, a passage for issuing a stream of fluid across said interaction region towards said means for receiving and resonant chamber means in fluid communication with said interaction region, and phasing means providing fluid coupling between said resonant chamber means of different oscillators to produce phase coordinated oscillations in said oscillators.

18. The combination according to claim 17 wherein said resonant chamber means comprise a pair of resonant chambers each in fluid communication with a different side of said interaction region between said passage for issuing and said means for receiving.

19. The combination according to claim 18 wherein said plural oscillators are arranged side by side transversely of the flow of fluid through said interaction regions and wherein said phasing means comprises fluid passages the lengths of which are a function of the wave length of the frequency of oscillation of said oscillator.

20. The combination according to claim 18 wherein said resonant chambers are arranged to effect sweeping motion of said streams of fluid upon issuance from said oscillators.

21. Plural oscillators comprising a first plurality of members each having a bottom wall of finite length, a pair of side walls extending upwardly from and generally transverse to said bottom wall and a pair of concave surfaces extending each from a different one of side walls, a second plurality of members each having a top wall, a pair of diverging side walls each extending from a different end of said top surface generally transverse thereto and a pair of concave surfaces each extending from a different one of said side walls, said members of said first plurality of members being arranged with said bottom walls co-planar and said side walls parallel to a common axis parallel to said bottom walls, and said members of said second plurality of members being arranged with said top walls coplanar and said sidewalls spaced equidistant from one another and aligned along an axis parallel to said top and side walls thereof, and means for positioning said members relative to one another such as to define between adjacent sidewalls of each pair of said first members a power nozzle, between adjacent sidewalls of each pair of said second members an output passage in fluid receiving relationship with said power nozzle and between each pair of a first and second member a resonant cavity communicating with a region between said power nozzle and said output passage.

* * * * *